United States Patent
Tsuda

(10) Patent No.: US 9,971,044 B2
(45) Date of Patent: May 15, 2018

(54) RADIATION DETECTOR AND TOF-PET APPARATUS HAVING THE SAME

(71) Applicant: SHIMADZU CORPORATION, Nishinokyo-Kuwabara-Cho, Nakagyo-Ku, Kyoto-Shi, Kyoto (JP)

(72) Inventor: Tomoaki Tsuda, Kyoto (JP)

(73) Assignee: SHIMADZU CORPORATION, Kyoto (JP)

(*) Notice: Subject to any disclaimer, the term of this patent is extended or adjusted under 35 U.S.C. 154(b) by 0 days. days.

(21) Appl. No.: 15/412,468

(22) Filed: Jan. 23, 2017

(65) Prior Publication Data
US 2017/0261622 A1 Sep. 14, 2017

(30) Foreign Application Priority Data
Mar. 14, 2016 (JP) .................. 2016-049967

(51) Int. Cl.
*G01T 1/20* (2006.01)
*G01T 1/164* (2006.01)
*G01T 1/29* (2006.01)
*G01T 1/208* (2006.01)
*G01T 1/202* (2006.01)

(52) U.S. Cl.
CPC ............ *G01T 1/208* (2013.01); *G01T 1/1644* (2013.01); *G01T 1/202* (2013.01); *G01T 1/2018* (2013.01); *G01T 1/2985* (2013.01)

(58) Field of Classification Search
CPC ..... G01T 1/1644; G01T 1/2018; G01T 1/202; G01T 1/208; G01T 1/2985
See application file for complete search history.

(56) References Cited

U.S. PATENT DOCUMENTS

| | | | |
|---|---|---|---|
| 2007/0085013 A1* | 4/2007 | Watson | G01T 1/2985 250/363.07 |
| 2011/0174980 A1* | 7/2011 | Gagnon | G01T 1/2018 250/362 |
| 2015/0001403 A1* | 1/2015 | Kim | G01T 1/2985 250/363.03 |
| 2016/0170045 A1* | 6/2016 | Kim | G01T 1/2985 250/208.1 |
| 2016/0209522 A1* | 7/2016 | Korcyl | G01T 1/2985 |
| 2016/0259066 A1* | 9/2016 | Moermann | G01T 1/006 |

FOREIGN PATENT DOCUMENTS

| JP | 2008525161 | 7/2008 |
|---|---|---|
| JP | 2016049967 | 4/2016 |

* cited by examiner

*Primary Examiner* — Mark R Gaworecki
(74) *Attorney, Agent, or Firm* — Andrew F. Young, Esq.; Lackenbach Siegel, LLP

(57) ABSTRACT

A radiation detector provides improved time-resolution under consideration of an incident of a multiple scattering event. An individual comparator 11 extracts a pulse from the detection element 3a through a total circuit 12 and converts to the time data. In addition, each detection element 3a comprises the total circuit 12, that outputs the pulse totaling the output of each detection element 3a, and the total comparator 13 that converts the pulses output from the total circuit 12 to the time data. According to the aspect of the present invention, the time data suitable from each discriminated event is processed, so that the emission-time of fluorescence can be more accurately determined.

5 Claims, 28 Drawing Sheets

Case of Photoelectric Absorption Event

Case of Multiple Scattering Event

Prior Art
Ieal Aspect

Practical Aspect

RADIATION DETECTOR AND TOF-PET APPARATUS HAVING THE SAME

CROSS REFERENCE TO RELATED APPLICATIONS

This application relates to and claims priority from JP Ser. No.: 2016-049967 filed Mar. 14, 2016, the entire contents of which are incorporated herein by reference.

FIGURE SELECTED FOR PUBLICATION

FIG. 1

BACKGROUND OF THE INVENTION

Field of the Invention

The present invention relates to a radiation detector that detects γ-ray and a radiation tomography imaging device having the same and particularly relates to a TOF-PET (Time-Of-Flight-Positron Emission Tomography).

Description of the Related Art

In a medical facility, a radiographic tomography imaging apparatus is equipped to perform an imaging of distribution of radiopharmaceuticals. The inventor sets forth a specific structure of such radiographic tomography imaging apparatus. A conventional radiation tomography imaging apparatus equips a radiation detector 51, having a scintillator in which scintillator crystals are arrayed as shown in FIG. 21, that are arranged circularly as shown in FIG. 22. The inventor sets forth briefly an operation of the radiation detector. When γ-ray is incident in the scintillator of the radiation detector, the γ-ray is converted to fluorescence by any one of the scintillation crystals. The detector recognizes which crystal generates the fluorescence and thereby can determine the incident location of the γ-ray (e.g., Patent Document 1).

Referring to FIG. 22, a detector ring 52 comprises such detectors arranged circularly. When the tomography imaging is performed, a subject is loaded inside the detector ring 52. It is given that the positron emission radiopharmaceuticals are accumulated in the emission-point p inside the detector ring. Radiation is frequently emitted from the emission-point p. The radiopharmaceuticals are labeled with a positron emission nucleus, so that the emitted radiation flying away in the opposite direction of 180° is the pair of γ-rays. Such pair is detected at the two different locations of the detector ring 52. It can be understood that the radiopharmaceuticals are located on the straight line (LOR) connecting both detection locations. However, the location of the emission-point p cannot be determined exactly yet. According to the conventional radiation fluoroscopy apparatus, the emission-point p is imaged by performing detection of such pair many times.

TOF-PET is an apparatus further developed from conventional apparatuses. If the emission-point p is located at the middle point of the LOR, the pair of γ-ray should be detected absolutely at the same time. If the emission-point p is located out of the middle point of the LOR, the detection time lag of the pair of the γ-ray takes place in the shift amount corresponding to such lag time. Specifically, if the time lag between two detected γ-rays were investigated, an approximate location of the emission-point p on the LOR could be obtained. The above is the principal of TOF-PET. According to TOF-PET, the more data can be obtained from one time detection of the pair of γ-rays, so that the more clearly sharp imaging can be performed.

Despite such TOF-PET, it is difficult to accurately determine the location of the emission-point p, at which the radiopharmaceuticals are accumulated. Referring to FIG. 23, accordingly to TOF-PET, the detection of the pair of γ-rays just only one time can provide the information indicating that the emission-point p is just around area surrounded by the broken lines.

RELATED PRIOR ART DOCUMENTS

Patent Document

Patent Document: Laid Open JP 2008-525161

ASPECTS AND SUMMARY OF THE INVENTION

Problems to be Solved by the Invention

However, there are following problems in the conventional system. Specifically, the conventional apparatus cannot afford the inherently satisfactory time resolution that could be accomplished by the TOF-PET.

Such problem depends on the structure of the conventional apparatus, FIG. 24 is illustrating such aspect. The respective two detectors that detect the γ-ray must output the time data indicating the respective detection times to identify the emission-location of the γ-ray pair relative to the TOF-PET. In practice, such detection time must be inaccurate due to the circuit structure of the detector. Specifically, referring to FIG. 24, a detection element that detects fluorescence is installed to the respective scintillator crystals and all outputs from such detection elements are input to the total circuit 62. When fluorescence is emitted from any of the scintillator crystals, a signal is output from the detection element corresponding to the crystals thereof and then input to the total circuit 62. The total circuit 62 outputs the combined-signal combining the outputs from all detection elements. The total circuit 62 outputs such combined-signal to a conversion circuit that converts such combined-signal to the detection time. The conversion circuit determines the emission-time, when the fluorescence was emitted, from the input timing of the combined-signal and outputs the data representing the time. Such data is the time data output from the detector.

Referring to FIG. 25, an ideal operation of the total circuit 62 is illustrated. A sharp pulse signal is output from the detection element corresponding to the crystals, from which fluorescence is emitted, is input to the total circuit 62. The detection element other than such input is null. Accordingly, the total circuit 62 should be operative so as to pass the input sharp pulse signal as-is.

Referring to FIG. 26, a practical operation of the total circuit 62 is illustrated. As illustrated, the total circuit 62 is not operative to work ideally. The sharp pulse signal becomes broader relative to the time because of losing sharpness while passing the total circuit 62. When the pulse signal passes through the total circuit 62, the time accuracy inherently possessed by the pulse deteriorates. The conventional TOF-PET is using such signal of which accuracy is deteriorated. Such deteriorated signal affects wrongfully on the imaging of radiopharmaceuticals. Specifically, referring to FIG. 27, the emission-location if the γ-ray cannot be decided clearly and the radiation distribution image may lose a focus.

The question is whether a TOF-PET can be structured using only the direct output from the detection element or not. If it is feasible, the total circuit 62 is not required, so that the emission-location of γ-ray keeping a sharp pulse can be identified.

However, in practice, it is hard to make such structure. Because, according to such structure in which the total circuit 62 is omitted, the numbers of pairs of γ-rays which could be detected become extremely small this time. Referring to FIG. 28, some incident γ-rays are converted to fluorescence by two different crystals. Such phenomenon is called a multiple scattering event. At this time, the two detection elements output the signal relative to the γ-ray detection, but each signal is weak and provides the poor S/N ratio. When the emission-location of γ-ray is identified based on such weak signal, the reliability relative to the emission-location of γ-ray decreases. According to the conventional structure, it is predicted that the multiple scattering event takes place, so that the total circuit 62 is installed. If the total circuit 62 is omitted, the data relative to the multiple scattering event cannot be obtained. All data relative to the multiple scattering event are discarded, the number of data points to perform an imaging of radiopharmaceuticals can be insufficient. The radiation distribution image becomes defocused, ad extremum.

Considering such circumstances, one purpose of the present invention is to provide a radiation detector of which time-resolution is improved under consideration of an incident of the multiple scattering event.

Means for Solving the Problem

The present invention comprises the following structures to solve the above problem.

Specifically, a radiation detector of the present invention comprises: a scintillator in which scintillator crystals that convert a radiation to fluorescence are arranged in a matrix in a plane and unified, and a light detector, having detection elements corresponding to the respective scintillator crystals, that detects fluorescence emitted from the scintillator; and wherein each output from the detection element branches to plural branch-pathways (pathways) and a pathway for calculating a fluorescence emission-time of photoelectric absorption event that is a phenomenon under which fluorescence is emitted from a single scintillator crystal, and the other pathway for calculating a fluorescence emission-time of the multiple scattering event that is a phenomenon under which a plurality of fluorescences are emitted from plural scintillator crystals; and further comprises: a photoelectric absorption time calculation means installed to each detection element, wherein pulses output from the detection element is input through the pathway for the photoelectric absorption event and the fluorescence emission-time relative to the photoelectric absorption event converts the pulses to the time data; a total means that totals each output for the multiple scattering event relative to each detection element; and a multiple scattering time calculation means that calculates the fluorescence emission-time relative to the photoelectric absorption event by converting the pulse output from the total means to the time data.

(Action and Effect)

According to the aspect of the present invention, a radiation detector of which time-resolution is improved under consideration of an incident of a multiple scattering event can be provided. Specifically, according to the aspect of the present invention, a photoelectric absorption time calculation means that extracts a pulse from the detection element without involvement of total means and converts to the time data is equipped to each detection element. The pulse without involvement of total means would not deteriorate and be converted to the time data as-is, so that the emission-time of fluorescence can be obtained more accurately. Such acquisition method for the time data is effective when the photoelectric absorption event takes place. On the other hand, when the multiple scattering event takes place, the radiation energy disperses in plural scintillator crystals and emits fluorescence, so that output from a single detection element cannot provide an accurate emission-time of fluorescence. Accordingly, according to the aspect of the present invention, a total means that outputs the total pulses totaling the output from each detection element; and a multiple scattering time calculation means that converts the pulse output from the total means to the time data. The total means totals weak pulses individually output from plural detection elements, so that the strong pulses comparative to the pulses output from the detection element on the incident of the photoelectric absorption event can be provided. Such pulse has a strong intensity despite more or less being deteriorated. In such way, if the pulses are converted to the time data, the emission-time of fluorescence can be obtained more accurately than utilizing the weak pulse before totaling. Such acquisition method for the time data is effective when the multiple scattering event takes place. According to the conventional method to acquire the time data, regardless the case in which either the photoelectric absorption event or the multiple scattering event takes place, the operation thereof is the same. Specifically, even when the photoelectric absorption event takes place, the time data deteriorate all the more because the data pass the total means. According to the aspect of the present invention, the time data suitable each discriminated event is processed, so that the emission-time of fluorescence can be more accurately determined.

Further, according to the above radiation detector, it is further preferable that the radiation detector comprises an event discrimination means that determines that if the number of the detection element that outputs a pulse relative to fluorescence detection is one, the fluorescence is emitted due to the photoelectric absorption event and if the number of detection elements that output pulses relative to fluorescence detection is plural, the fluorescence is emitted due to the multiple scattering event.

[Action and Effect]

The above describes more preferable structure of the present invention. If the structure that determines whether the detected fluorescence is due to the photoelectric absorption event or due to the multiple scattering event is equipped, it can be determined which is more suitable between the time data output from the photoelectric absorption time calculation means and the time data output from the multiple scattering time calculation means based on the incident event, Further, according to the above radiation detector, it is further preferable that a pathway of the output pathways of the detection elements is the pathway to calculate the fluorescence emission-location, and the radiation detector comprises a fluorescence emission-location calculation means that converts the certain pulses to the location data indicating the emission-location of the fluorescence by inputting the pulses output from the detection element through the pathway for the fluorescence emission-location.

[Action and Effect]

The above describes more preferable structure of the present invention. If the fluorescence emission-location calculation means is equipped, the radiation detector capable of determining the emitted location of the fluorescence can be formed.

In addition, the above radiation detector more preferably comprises a crystal discrimination means that determines the scintillator crystals corresponding to the detection element emitted weaker pulse of two pulses as the emission-location of the fluorescence when two detection elements output pulses relative to the fluorescence detection.

[Action and Effect]

The above describes more preferable structure of the present invention. It is deemed that the scintillator crystal corresponding to the detection element that emits a weaker pulse out of two pulses first emits fluorescence relative to the multiple scattering event. According to such aspect, the radiation detector capable of accurately determining the emission-location of the fluorescence can be formed.

Further, according to a TOF-PET having the above radiation detector further preferably comprises the detector ring formed by arranging the detector circularly and an image generation means that performs imaging the distribution of radiopharmaceuticals while changing time-resolution depending on determining whether radiation is detected by the photoelectric absorption event or the multiple scattering event when the detection ring detects the diminishing radiation pair.

[Action and Effect]

If the TOF-PET comprises the radiation detector according to the aspect of the present invention, an image reflecting the time-resolution difference between the multiple scattering event and the photoelectric absorption event can be generated. In such way, the space-resolution of the TOF-PET can be higher as results.

Effect of the Invention

According to the aspect of the present invention, a photoelectric absorption time calculation means that extracts a pulse from the detection element without the total means and converts to the time data is equipped to each detection element. In addition, each detection element comprises a total means that outputs the pulse totaling the output from each detection element and a multiple scattering time calculation means that converts the pulse output from the total means to the time data. According to the aspect of the present invention, the time data suitable each discriminated event is processed, so that the emission-time of fluorescence can be more accurately determined.

The above and other aspects, features and advantages of the present invention will become apparent from the following description read in conjunction with the accompanying drawings, in which like reference numerals designate the same elements.

DETAILED DESCRIPTION OF THE PREFERRED EMBODIMENTS

Figure 1:
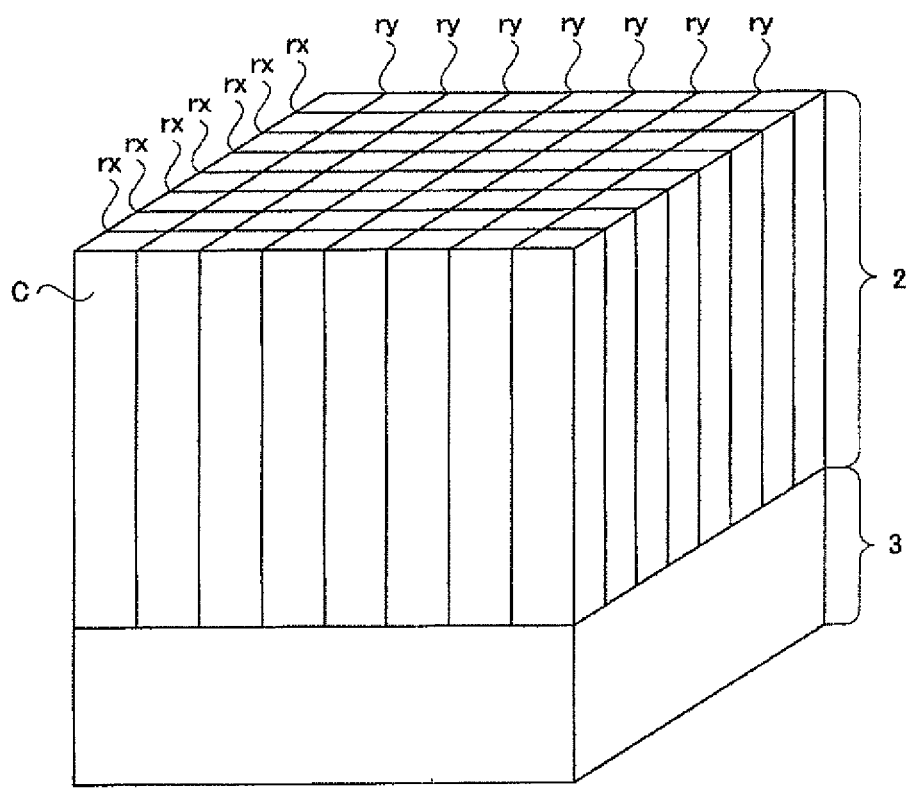
FIG. 1 is a perspective view illustrating a structure of a radiation detector according to the aspect of the present invention.

Reference will now be made in detail to embodiments of the invention. Wherever possible, same or similar reference numerals are used in the drawings and the description to refer to the same or like parts or steps. The drawings are in simplified form and are not to precise scale. The word 'couple' and similar terms do not necessarily denote direct and immediate connections, but also include connections through intermediate elements or devices. For purposes of convenience and clarity only, directional (up/down, etc.) or motional (forward/back, etc.) terms may be used with respect to the drawings. These and similar directional terms should not be construed to limit the scope in any manner. It will also be understood that other embodiments may be utilized without departing from the scope of the present invention, and that the detailed description is not to be taken in a limiting sense, and that elements may be differently positioned, or otherwise noted as in the appended claims without requirements of the written description being required thereto.

Various operations may be described as multiple discrete operations in turn, in a manner that may be helpful in understanding embodiments of the present invention; however, the order of description should not be construed to imply that these operations are order dependent.

It will be further understood by those of skill in the art that the apparatus and devices and the elements herein, without limitation, and including the sub components such as detection elements, control elements of all kinds, control elements, TOF-PET elements, drivers, driving elements, display elements, operation elements, inputs, sensors, detectors, memory elements, processors and combinations of these structures etc. will be understood by those of skill in the art as also being identified as or capable of being structures and component circuits or elements or pathways or combinations of the same and structures that accomplish the functions without restrictive language or label requirement since those of skill in the art are well versed in computer and operational controls and technologies of radiographic devices and all their sub components, including various circuits and combinations of circuits without departing from the scope and spirit of the present invention.

Embodiment 1

(Entire Structure of the Radiation Detector)

Referring to FIG. 1, a radiation detector 1 comprises a scintillator 2 in which scintillator crystals C are arraigned in a matrix in a plane, and a light detector 3 that is installed underside the scintillator 2 and detects fluorescence emitted from the scintillator 2. Referring to FIG. 1, the long scintillator crystals C in the height direction are arranged in the 2-dimensional matrix having 8 in the length direction and 8 in the width direction, so that 64 scintillator crystals C are included. In the scintillator 2, the scintillator crystals C that convert a radiation to fluorescence are arranged in the matrix in the plane and unified. The numbers of scintillator crystals C are just for example. The numbers of scintillator crystals C can be increased or decreased based on an application purpose.

The scintillator crystals C comprises LGSO (Lu, Gd) 2Si05 containing cerium element, so that when the γ-ray is incident, the scintillator crystals C characteristically emit fluorescence. Instead of LGSO, the scintillator crystals C may comprise GSO (Gd2Si05) and so forth. The scintillator crystal C converts the γ-ray to fluorescence.

The scintillator 2 comprises a reflection board rx extending in the width direction and a reflection board ry extending in the length direction. The reflection board rx is installed between scintillator crystals C adjacent each other in the length direction and the reflection board ry is installed between scintillator crystals C adjacent each other in the width direction. Accordingly, the scintillator crystals C that are adjacent each other are partitioned with either the reflection board rx or the reflection board ry.

The light detector 3 detects the fluorescence emitted from the scintillator 2. The detection elements corresponding to the respective scintillator crystals C constituting the scintillator 2 are arranged in the 2-dimensional matrix in the plane of the light detector 3, which connects the scintillator 2 and one detection element detects the fluorescence emitted from one scintillator crystal C. In such way, the light detector 3, having detection elements 3a corresponding to the respective scintillator crystals C, that detects fluorescence emitted from the scintillator 2.

Figure 2:
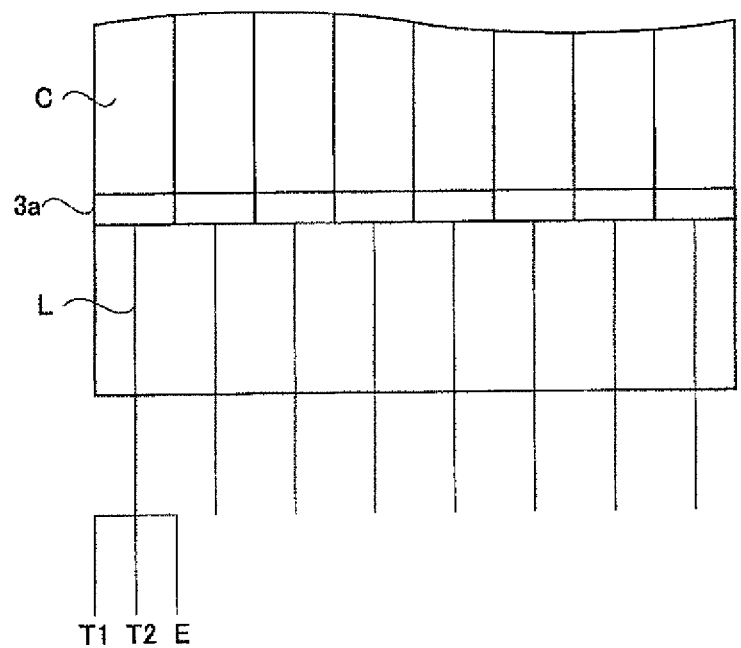
FIG. 2 is a plan view illustrating a structure of a radiation detector according to the aspect of the present invention.

Referring to FIG. 2, the aspect of the detection element 3a having the light detector 3 is set forth. A signal wiring L that outputs a pulse signal radiated, when the fluorescence is detected, is installed to each detection element 3a. Such signal wiring L branches to 3 branch-pathways (pathways) and one of the pathways is the pathway T1 that is used to calculate the emission-time of fluorescence every detection element. Another pathway is the pathway T2 that is used to calculate the emission-time of fluorescence as to the entire light detector 3. The last pathway is the pathway E that is used to calculate the emission-location of the fluorescence and the energy of the fluorescence. From now on, the inventor sets forth how the respective pathways are connected.

<Pathway T1>

Figure 3:
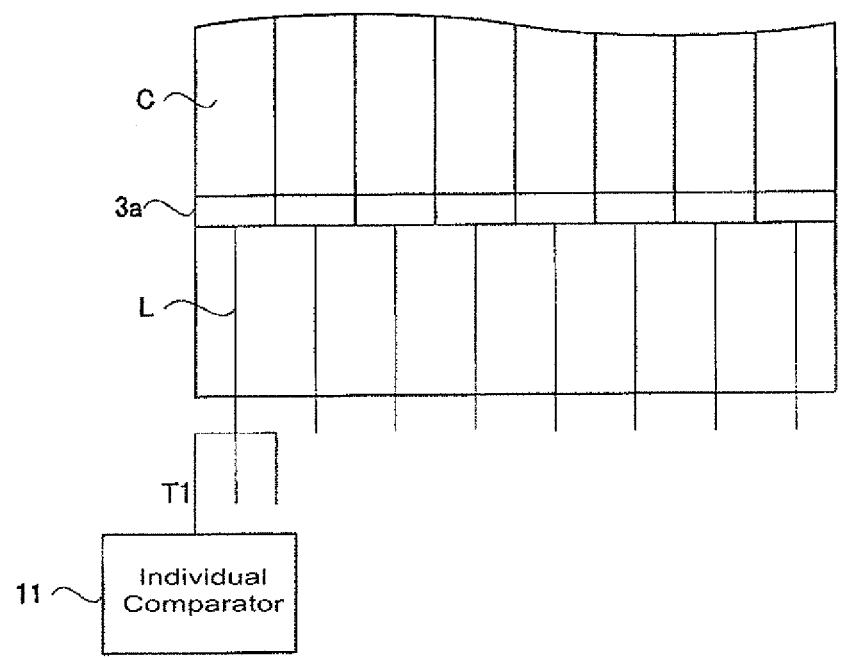
FIG. 3 is a plan view illustrating a structure of a radiation detector according to the aspect of the present invention.

Referring to FIG. 3, the pathway T1 is connected to an individual comparator 11. The individual comparator 11 outputs the data (time information) indicating the emission-time of the fluorescence based on the input timing of the pulse signal when the pulse signal is input from the pathway T1. Referring to FIG. 3, only one individual comparator 11 is shown, but the individual comparator 11 per se is installed to the respective pathways T1 relative to each detection element 3a. Accordingly, the same numbers of the individual comparators 11 as the detection elements are installed to the light detector 3. The individual comparator 11 is installed to each detection element 3a, wherein the fluorescence emission-time relative to the photoelectric absorption event is calculated by inputting pulses from the detection element 3a through the pathway for the photoelectric absorption event and converting the pulses to the time data. The individual comparator 11 corresponds to the photoelectric absorption time calculation means of the present invention.

<Pathway T2>

Figure 4:
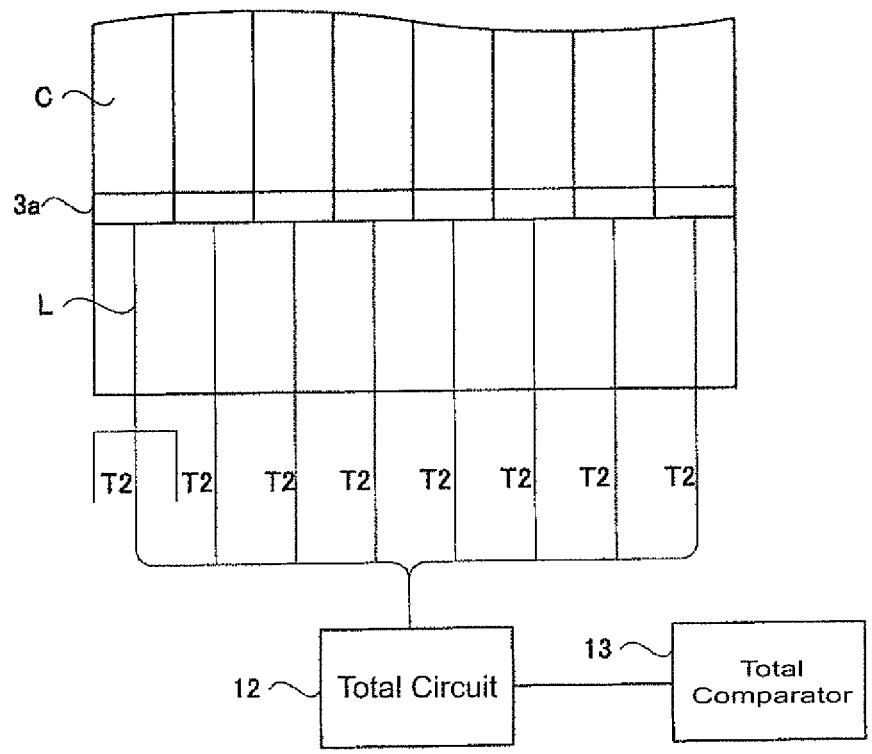
FIG. 4 is a plan view illustrating a structure of a radiation detector according to the aspect of the present invention.

Referring to FIG. 4, the pathway T2 is connected to a total circuit 12. The pathway T2 is installed respectively to each detection element 3a and all pathways T2 are input to one total circuit 12. The total circuit 12 calculates the total output of all pathways T2. The output from the detection element 3a through the pathway T2 is a pulse signal, so that the total circuit 12 also outputs the pulse signal. The total circuit 12 outputs the pulse signal relative to the total result to the total comparator 13. The total comparator 13 outputs the data (time information) indicating the emission-time of the fluorescence based on the input timing of the pulse signal when receives the pulse signal input from the total circuit 12. The total circuit 12 that outputs the pulse, which is the total of the respective outputs from each pathway of the photoelectric absorption event relative to each detection element 3a, corresponds to the total means of the present invention. The total comparator 13 that calculates the fluorescence emission-time relative to the multiple scattering event by converting the pulse output from the total circuit 12 to the time data corresponds to the multiple scattering time calculation means of the present invention.

In such way, each output from the detection element 3a branches to plural branch-pathways (pathway), and a pathway T1 is the pathway for calculating a fluorescence emission-time of photoelectric absorption event that is a phenomenon under which fluorescence is emitted from a single scintillator crystal, and the other pathway T2 is the pathway for calculating a fluorescence emission-time of multiple scattering event that is a phenomenon under which fluorescences are emitted from plural scintillator crystals.

(Pathway E)

Figure 5:
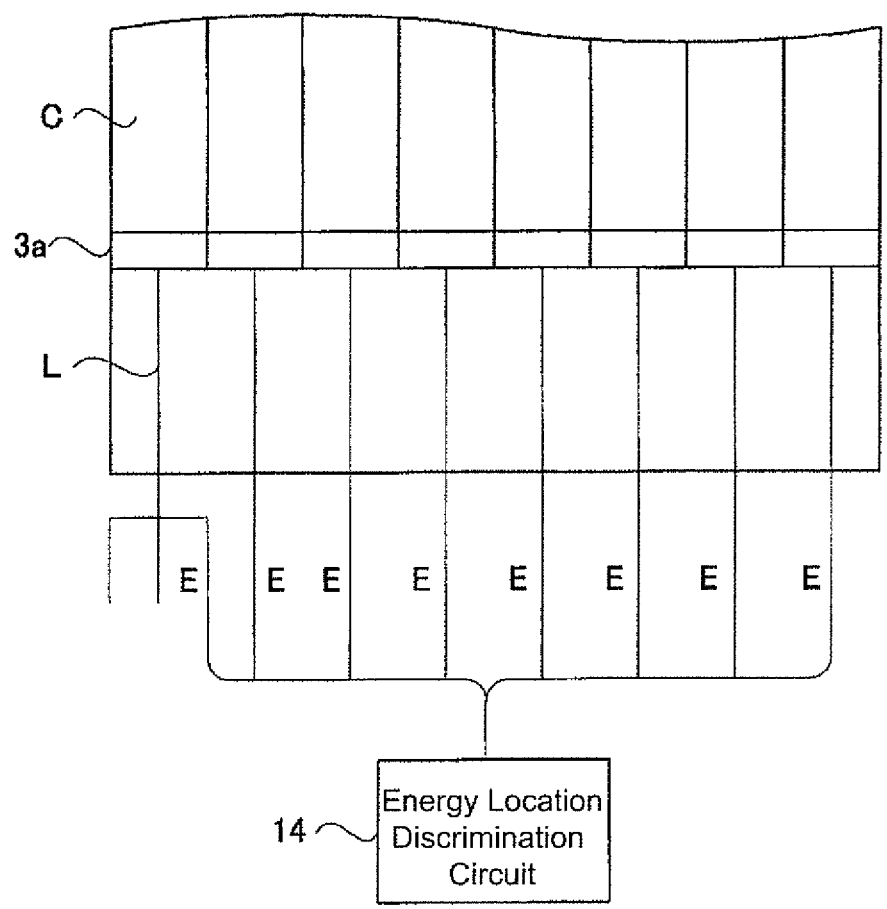
FIG. 5 is a plan view illustrating a structure of a radiation detector according to the aspect of the present invention.

Referring to FIG. 5, the pathway E is input to an energy location discrimination circuit 14. The energy location discrimination circuit 14 calculates the strength (energy) of the fluorescence emitted from the scintillator 2 and the fluorescence emission-location indicating which crystal emits based on the output from the pathway E of each detection element 3a. At this time, the energy calculated by the energy location discrimination circuit 14 means the total of fluorescences detected by the entire scintillator 2. Specifically, a pathway E of outputs from the detection element 3a is the pathway to calculate the fluorescence emission-location and the energy location discrimination circuit 14 inputs the pulse output from the detection element 3a through the pathway for the fluorescence emission-location, and converts the pulse to the location data indicating the fluorescence emission-location. The energy location discrimination circuit 14 corresponds to the fluorescence emission-location calculation means of the present invention.

(Time Data Selection Circuit)

Figure 6:
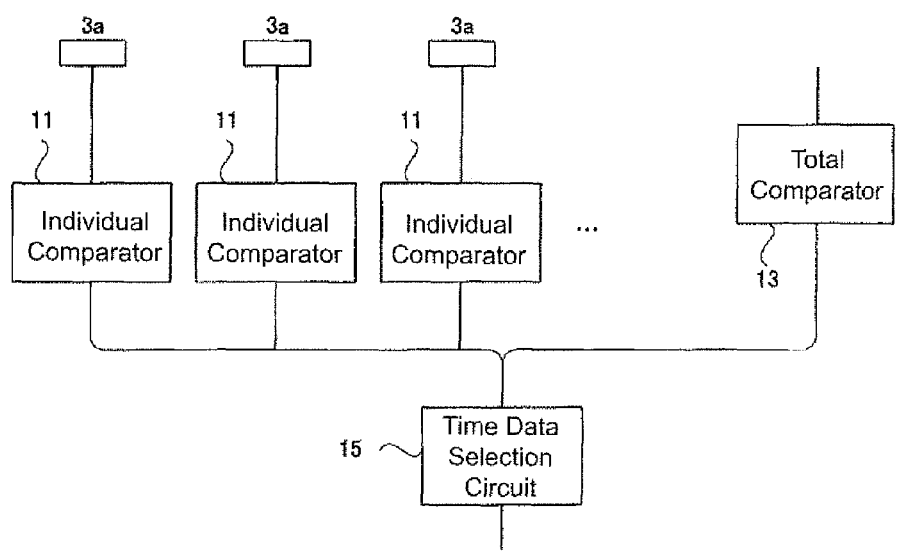
FIG. 6 is a plan view illustrating a structure of circuits relative to a radiation detector according to the aspect of the present invention.

Referring to FIG. 6, the time data selection circuit 15 monitors an output from each individual comparator 11 and an output from the total comparator 13, and discriminates either output from the comparator when fluorescence is emitted from the scintillator 2. The time data selection circuit 15 outputs the discriminated output (time data) to outside the radiation detector as the output of the light detector 3. The time data selection circuit 15 corresponds to the event discrimination means of the present invention.

Figure 7A:
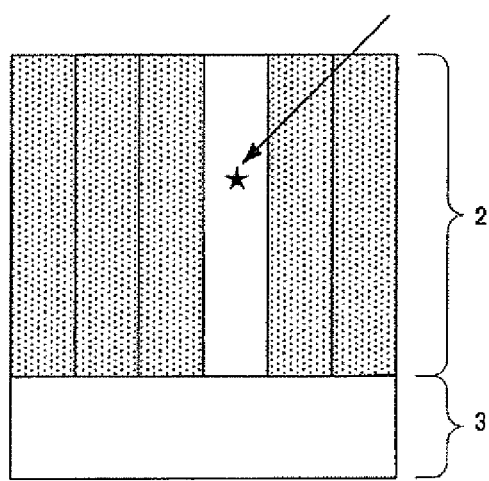
FIG. 7A, 7B are schematic views illustrating a photoelectric absorption event and a multiple scattering event according to the aspect of the present invention.
Figure 7B:
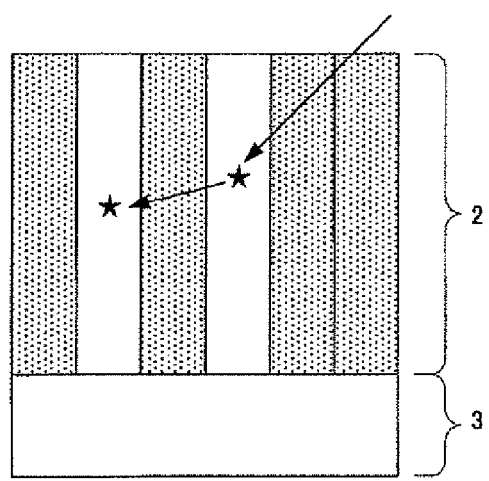

As the time data selection circuit 15 varies the operation thereof in accordance with the aspect of the fluorescence emitted from the scintillator 2, the inventor sets forth first the fluorescence aspect. Referring to FIG. 7A, the photoelectric absorption event means the phenomenon in which a radiation is converted to the fluorescence by one scintillator crystal. In such case, only one individual comparator 11 of the respective individual comparators 11 outputs the time data. In addition, at this time, the total comparator 13 acquires a pulse signal through the pathway T2 and outputs the time data. Referring to FIG. 7B, the multiple scattering event means the phenomenon in which a radiation is converted to the fluorescence by plural scintillator crystals. In such case, plural individual comparators 11 of the respective individual comparators 11 output the time data. In addition, at this time, the total comparator 13 also acquires a pule signal through the pathway T2 and outputs the time data.

(Operation of the Time Data Selection Circuit when the Photoelectric Absorption Event Takes Place)

Figure 8:
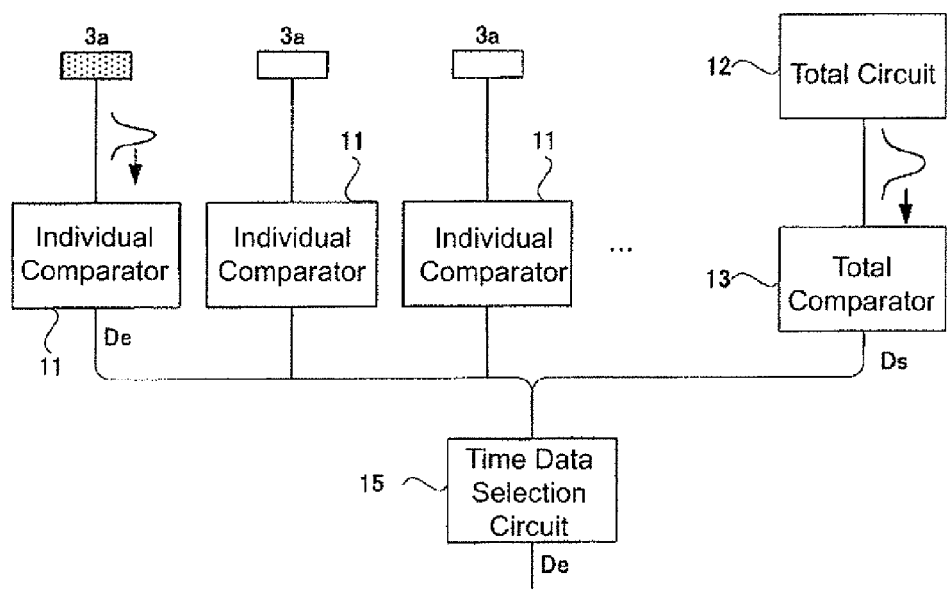
FIG. 8 is a schematic diagram illustrating a structure of a radiation detector according to the aspect of the present invention.

Referring to FIG. 8, the operation of the time data selection circuit 15 is set forth when the photoelectric absorption event takes place. In the case of the photoelectric absorption event, given the detection element 3a, indicated by the shaded region, detects the fluorescence; none of other detection element 3a detects fluorescence. The pulse signal output from the detection element 3a branches to 3 pathways and one of three pathways is output to the individual comparator 11 through the pathway T1. The individual comparator 11 outputs the time data De based on the pulse signal thereof. In the photoelectric absorption event, only the individual comparator 11 corresponding to the detection element 3a indicated by the shaded region outputs the time data and no other individual comparator 11 outputs the time data.

Figure 25:
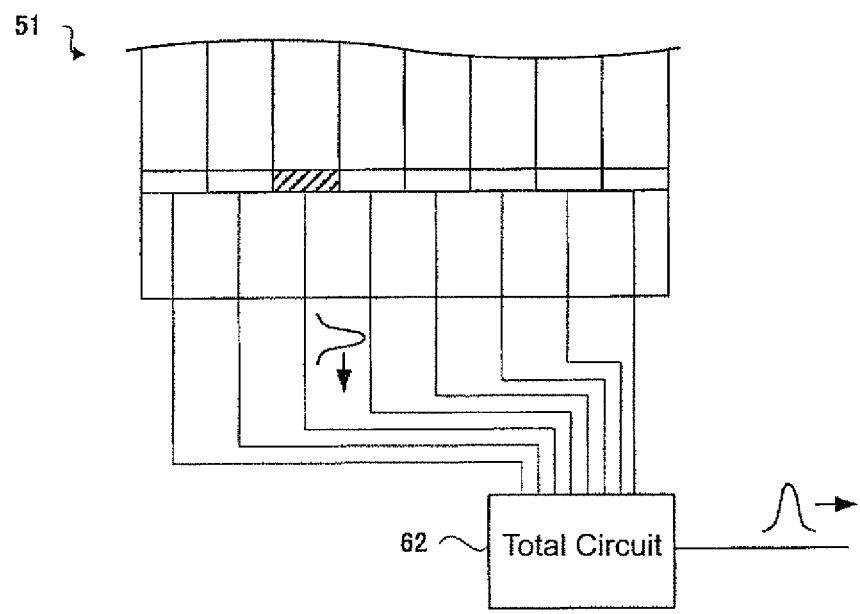
FIG. 25 is a schematic diagram illustrating a conventional radiation detector.
Figure 26:
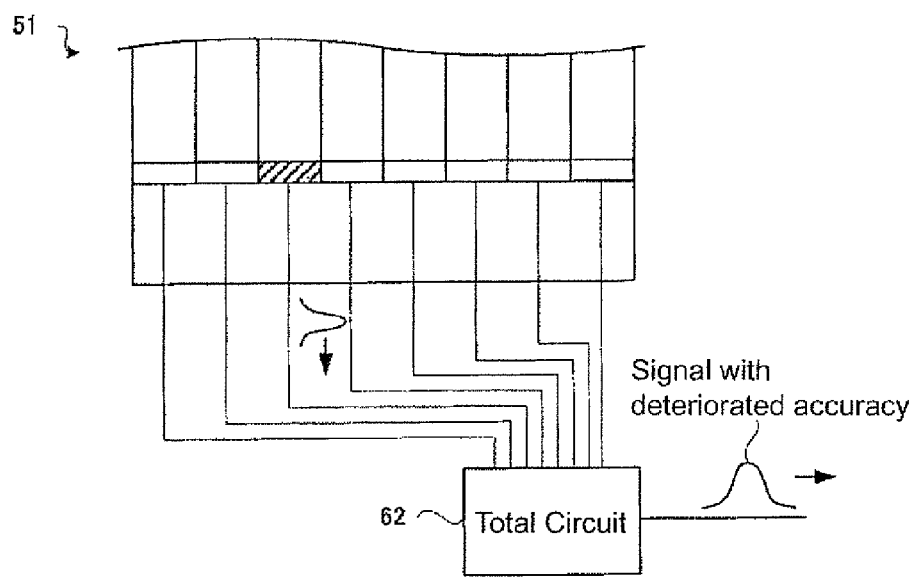
FIG. 26 is a schematic diagram illustrating a conventional radiation detector.
Figure 27:
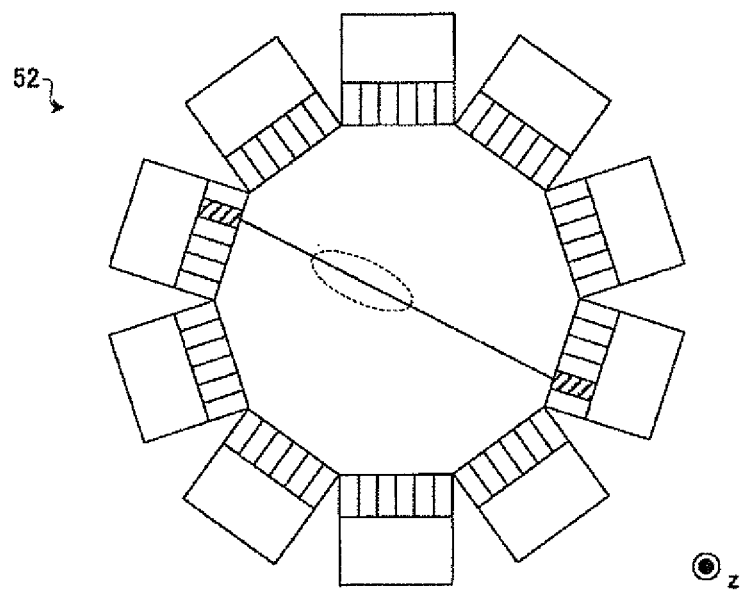
FIG. 27 is a schematic diagram illustrating a conventional TOF-PET apparatus.
Figure 28:
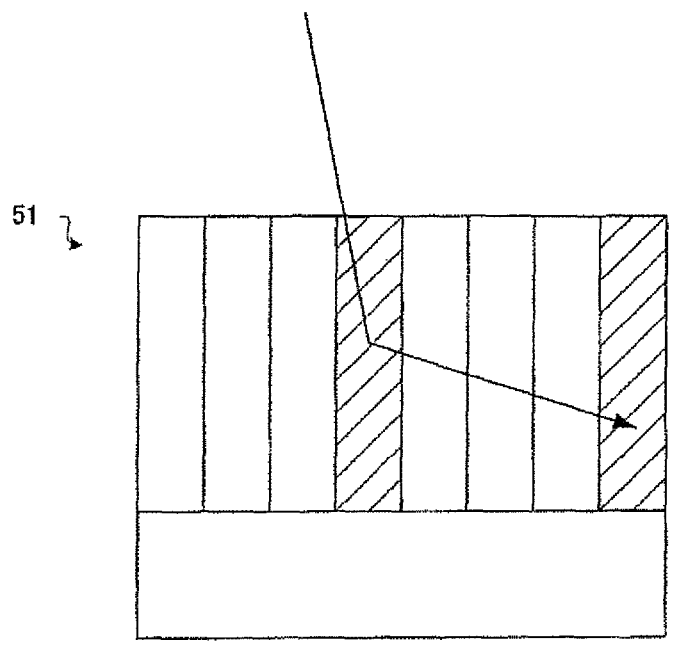
FIG. 28 is a schematic diagram illustrating a conventional radiation detector.

On the other hand, the pulse signal that is output from the detection element 3a and travels to the pathway T2 is input to the total comparator 13 through the total circuit 12. Referring to FIG. 25, even though the total circuit 12 ideally outputs the pulse signal output from the detection element 3a as-is, the pulse signal relative to the total result output from the total circuit 12 actually deteriorates as to capability of the time discrimination. The pulse signal relative to the total result is converted to the time data Ds by the total comparator 13. Such time data Ds is originated in the dull signal passing through the total circuit 12, so that it can be deemed less reliable.

When just only one time data is input from the individual comparator 11, the time data selection circuit 15 decides that the detected fluorescence is relative to the photoelectric absorption event, and accordingly, determines that the time data De output from the individual comparator 11 is more reliable than the time data Ds output from the total comparator 13 so that the time data De can be output. The time data De has been converted as-is to the time data without involvement of the total circuit 12, so that the time data is originated in the pulse signal undeteriorated with time. Accordingly, when the photoelectric absorption event takes place, the time data De becomes more reliable than the time data Ds.

(Operation of the Time Data Selection Circuit when the Multiple Scattering Event Takes Place)

Figure 9:
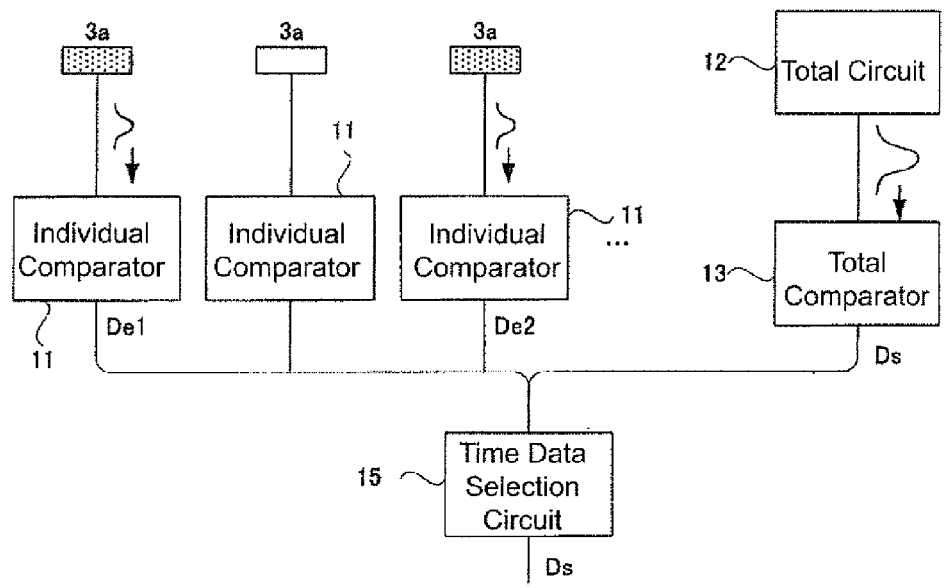
FIG. 9 is a schematic diagram illustrating a structure of a radiation detector according to the aspect of the present invention.

Referring to FIG. 9, the operation of the time data selection circuit 15 is set forth when the multiple scattering event takes place. In the case of the multiple scattering event, it is given the plural detection elements 3a, indicated as shaded regions, detect the fluorescence. In the multiple scattering event, the radiation energy is distributed to plural scintillator crystals and then fluorescences are emitted. Accordingly, each one of fluorescences is weaker than the fluorescence relative to the photoelectric absorption event. As result, the pulse signal output from the detection element 3a is weaker than the pulse signal relative to the photoelectric absorption event. Such plural pulse signals are generated at the different detection element 3a and input to the respective different individual comparators 11 through the pathway T1. Accordingly, plural individual comparators 11 output the time data individually. Referring to FIG. 9, the time data De2 other than the time data De1 is output from the individual comparator 11 is output from another individual comparator 11. Such time data De1, De2, are originated in the weak pulse signal, so that it can be deemed little reliable.

On the other hand, the pulse signal that is output from the detection element 3a and travels to the pathway T2 is input to the total comparator 13 through the total circuit 12. The pulse signal relative to the total result is converted to the time data Ds by the total comparator 13.

When plural time data are input from the individual comparator 11, the time data selection circuit 15 decides that the detected fluorescence is relative to the multiple scattering event, and accordingly, determines that the time data Ds output from the total comparator 13 is more reliable than the time data De output from the individual comparator 11 so that the time data Ds can be output. The time data Ds has been converted to the time data through the total circuit 12, so that the time data is originated in the more strong pulse signal. Accordingly, when the multiple scattering event takes place, the time data Ds becomes more reliable than the time data De.

In such way, when a fluorescence is emitted from the scintillator 2, the time data selection circuit 15 is operative to determine that if the detection element 3a that outputs the pulse relative to fluorescence detection is one; the fluorescence is emitted due to the photoelectric absorption event, and if the detection elements 3a that output pulses relative to fluorescence detection are plural, the fluorescence is emitted due to the multiple scattering event.

As set forth above, according to the present invention, a radiation detector of which time-resolution is improved under consideration of an incident of multiple scattering event can be provided. Specifically, according to the aspect of the present invention, an individual comparator 11 that extracts a pulse from the detection element 3a without involvement of the total circuit 12 and converts to the time data is equipped to each detection element 3a. The pulse without involvement of the total circuit 12 would not deteriorate and be converted to the time data as-is, so that the emission-time of fluorescence can be more accurate. Such acquisition method for the time data is effective when the photoelectric absorption event takes place.

On the other hand, when the multiple scattering event takes place, the radiation energy disperses in plural scintillator crystals and emits fluorescence, so that output from a single detection element 3a cannot provide an accurate emission-time of fluorescence. Then, each detection element 3a comprises the total circuit 12 that outputs the pulse totaling the output of each detection element 3a and the total comparator 13 that converts the pulse output from the total circuit 12 to the time data. The total circuit 12 totals weak pulses individually output from plural detection elements 3a, so that the strong pulses comparative to the pulses output from the detection element 3a on the incident of the photoelectric absorption event can be provided. Such pulse has a strong intensity despite more or less being deteriorated. In such way, if the pulses are converted to the time data, the emission-time of fluorescence can be obtained more accurately than utilizing the weak pulse before totaling. Such acquisition method for the time data is effective when the multiple scattering event takes place.

According to the conventional method to acquire the time data, regardless the case in which either the photoelectric absorption event or the multiple scattering event takes place, the operation thereof is the same. Specifically, even when the photoelectric absorption event takes place, the time data deteriorate all the more because the data pass the total circuit 12. According to the aspect of the present invention, the time data suitable each discriminated event is processed, so that the emission-time of fluorescence can be more accurately determined.

(Application Embodiment for TOF-PET)

Figure 10:
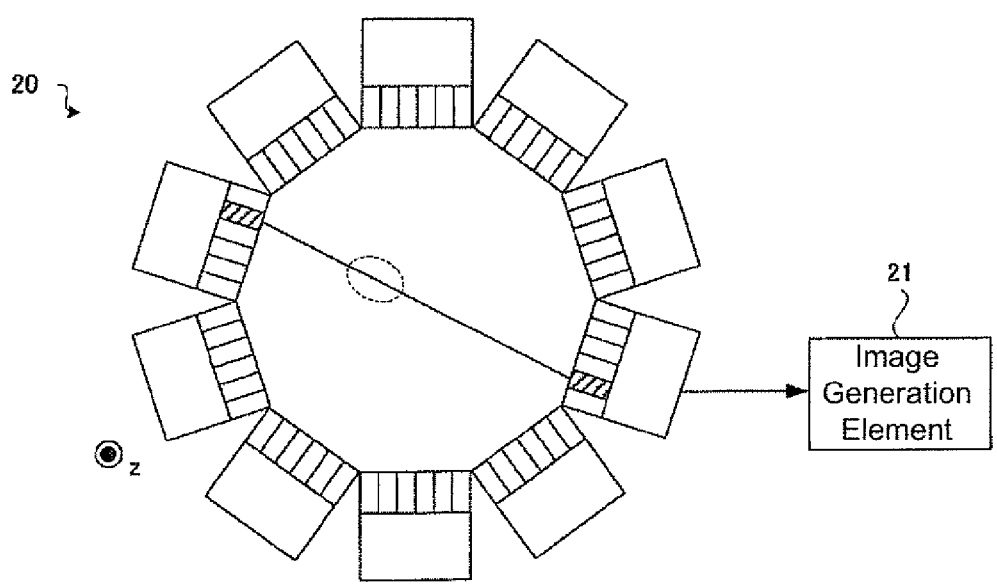
FIG. 10 is a functional block view illustrating a structure of a TOF-PET apparatus equipped a radiation detector according to the aspect of the present invention.
Figure 22:
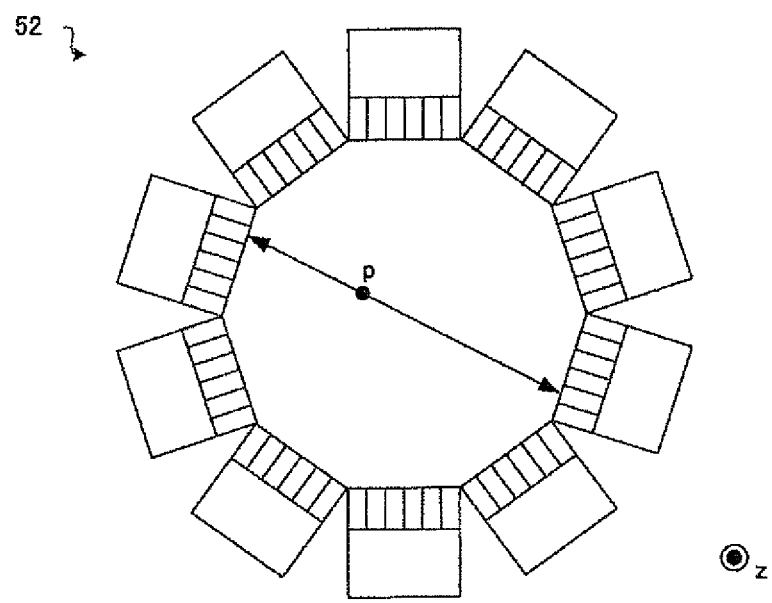
FIG. 22 is a schematic diagram illustrating a conventional radiographic apparatus.
Figure 23:
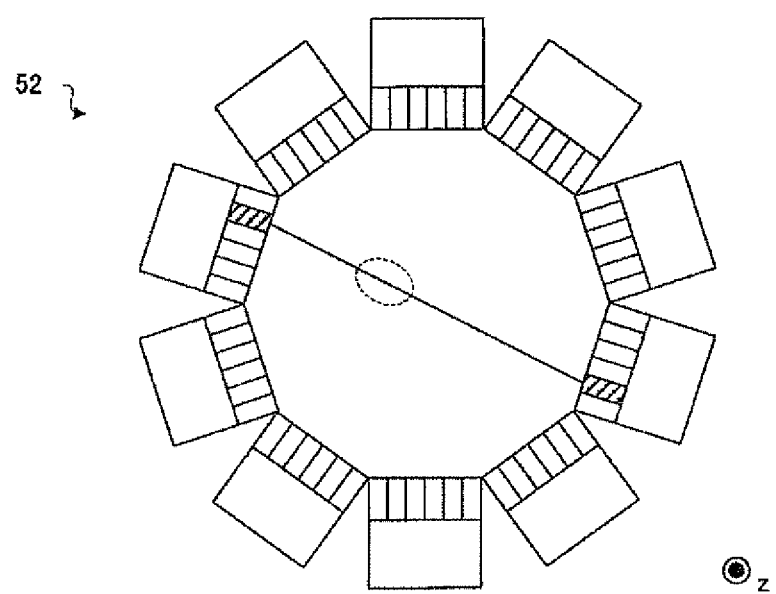
FIG. 23 is a schematic diagram illustrating an operation of the conventional X-ray radiographic apparatus.
Figure 24:
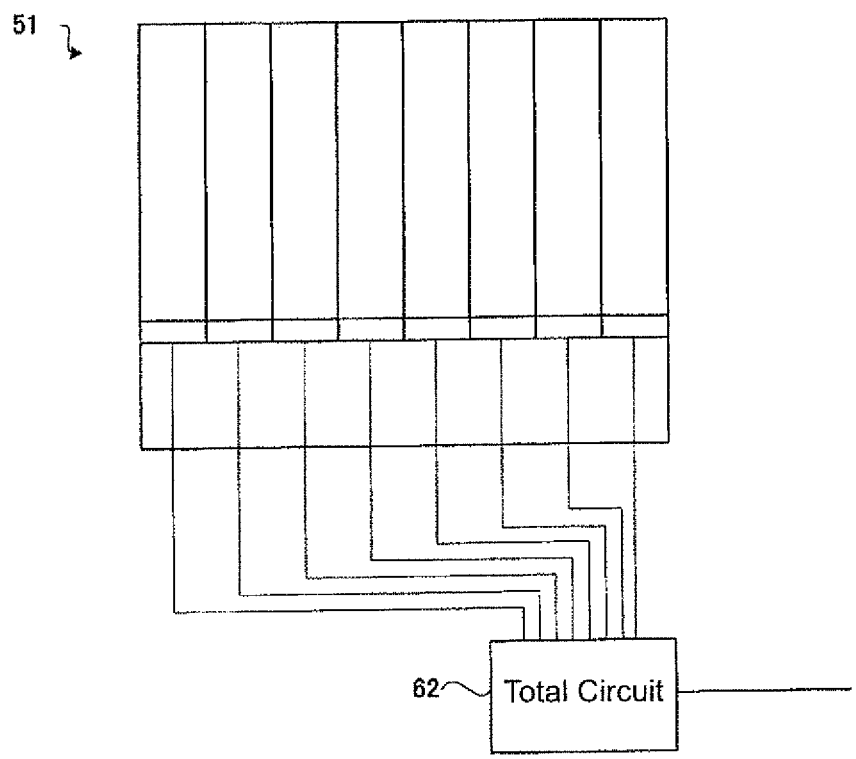
FIG. 24 is a schematic diagram illustrating a conventional radiation detector.

Hereinafter, the inventor sets forth Embodiments of TOF-PET referring to FIG. 22 to which the radiation detector of the present invention is applied. Referring to FIG. 10, the TOF-PET according to the aspect of the present invention is set forth. The TOF-PET according to the aspect of the present invention comprises detector rings 20 formed by arranging the radiation detectors circularly and an image generation element 21 that generates an tomography image imaging distribution of radiopharmaceuticals based on outputs from the detector rings 20.

In such way, the TOF-PET comprises the radiation detector according to the aspect of the present invention so that the distribution of radiopharmaceuticals can be imaged by changing the time resolutions. Hereinafter, the inventor sets forth the above aspects.

Figure 11:
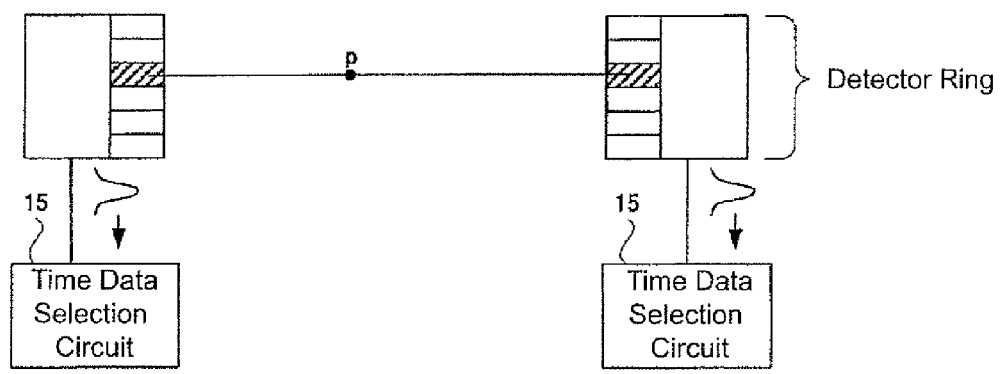
FIG. 11 is a schematic diagram illustrating an operation of a TOF-PET apparatus equipped a radiation detector according to the aspect of the present invention.

Referring to FIG. 11, the aspect in which the two radiation detectors forming the detector ring is detecting each of the γ-ray pair emitted at the emission-point p is illustrated. In such case, it is given that both of the γ-ray pair are detected by the radiation detector due to the photoelectric absorption event.

Referring to FIG. 11, in such case, either one of γ-ray pair is converted to the fluorescence by one of the scintillator crystals, which a radiation detector has, and the time data is generated based on the sharp pulse signal output from one detection element corresponding to such crystal. The time data selection circuit 15 outputs such time data as the emission-time to outside the radiation detector. The other one of γ-ray pair is detected as well by the other radiation detector.

Figure 12:
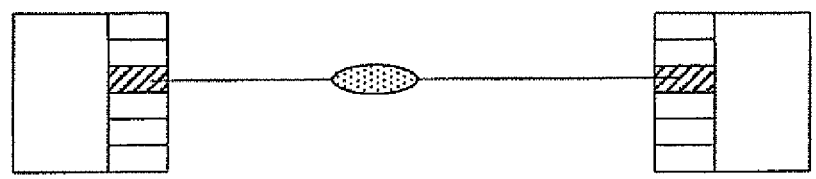
FIG. 12 is a schematic diagram illustrating an operation of a TOF-PET apparatus equipped a radiation detector according to the aspect of the present invention.

Referring to FIG. 12, when both of the γ-ray pair are detected by the photoelectric absorption event as illustrated in FIG. 11, the existing location of the emission-point of the γ-ray pair calculated by the TOF-PET apparatus is indicated by the shade. The emission-point p of the γ-ray pair is on the linear line (LOR: Line of Response) connecting the scintillator crystals that detected each γ-ray, and is calculated given the location is the side of the detector which detects γ-ray earlier than the other detector between the two detectors that detect γ-ray. The time resolution of the radiation detector is limited, so that the location of the emission-point p is extending along the LOR.

Figure 13:
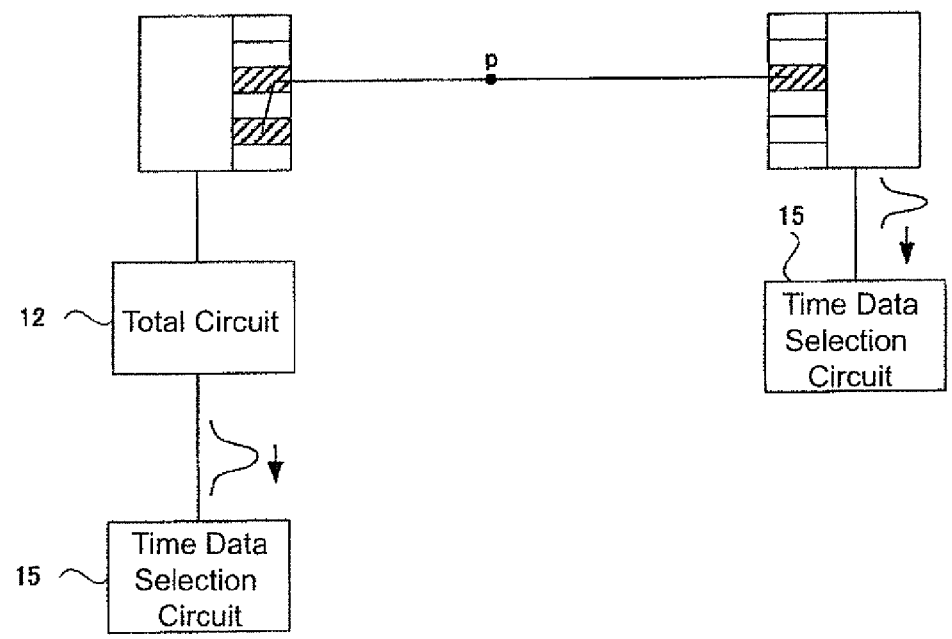
FIG. 13 is a schematic diagram illustrating an operation of a TOF-PET apparatus equipped a radiation detector according to the aspect of the present invention.

Referring to FIG. 13, the aspect in which the two radiation detectors forming the detector ring is detecting each of the γ-ray pair emitted at the emission-point p is illustrated. In such case, it is given that one of the γ-ray pair is detected by the radiation detector due to the photoelectric absorption event and the other one is detected by the radiation detector due to the multiple scattering event.

Referring to FIG. 13, one of the γ-ray pair is converted to fluorescences by plural scintillator crystals C of a radiation detector and weak pulse signals output from plural detection element 3a corresponding to such crystals are totaled, so that the weak pulse signals become strong despite dull signals and the time data can be generated based on such strong signals. The time data selection circuit 15 outputs such time data to outside the radiation detector as the emission-time of the fluorescence. As well as set forth referring to FIG. 11, the other one of the γ-ray pair is converted to fluorescences by one of scintillator crystals of the other radiation detector, so that the time data can be generated based on the sharp pulse signal output from one detection element 3a corresponding to such crystal. The time data selection circuit 15 outputs such time data as the emission-time to outside the radiation detector.

Figure 14:
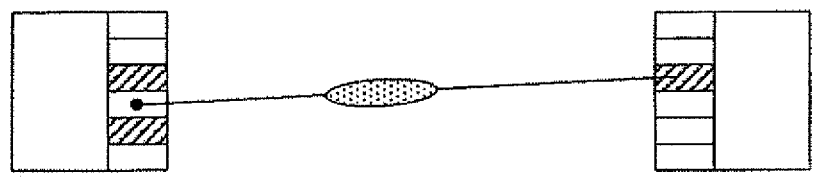
FIG. 14 is a schematic diagram illustrating an operation of a TOF-PET apparatus equipped a radiation detector according to the aspect of the present invention.

Referring to FIG. 14, when one of the γ-ray pair is detected by the photoelectric absorption event and the other one is detected by the multiple scattering event as illustrated in FIG. 13, the existing location of the emission-point of the γ-ray pair calculated by the TOF-PET apparatus is indicated by the shade. The existing location of the emission-point of the γ-ray pair is on the LOR connecting between the middle point of plural scintillator crystals that detect the γ-ray relative to the multiple scattering event and the scintillator crystal that detects the γ-ray relative to photoelectric absorption event, and is calculated given the location is the side of the detector which detects the γ-ray earlier than the other detector between the two detectors that detect the γ-ray. The existing location of the emission-point p, which is calculated at this time, becomes broader than that in the case referring to FIG. 12. The time resolution of γ-ray detection is worsen as much as one of the γ-ray pair is detected by the multiple scattering event.

According to the aspect of the Embodiment 1, the energy location discrimination circuit 14 outputs the location of the middle point of plural scintillator crystals that detect the γ-ray when the multiple scattering event takes place. The energy location discrimination circuit 14 is not operational to identify which crystal emits when the plural scintillator crystals emit fluorescences.

Figure 15:
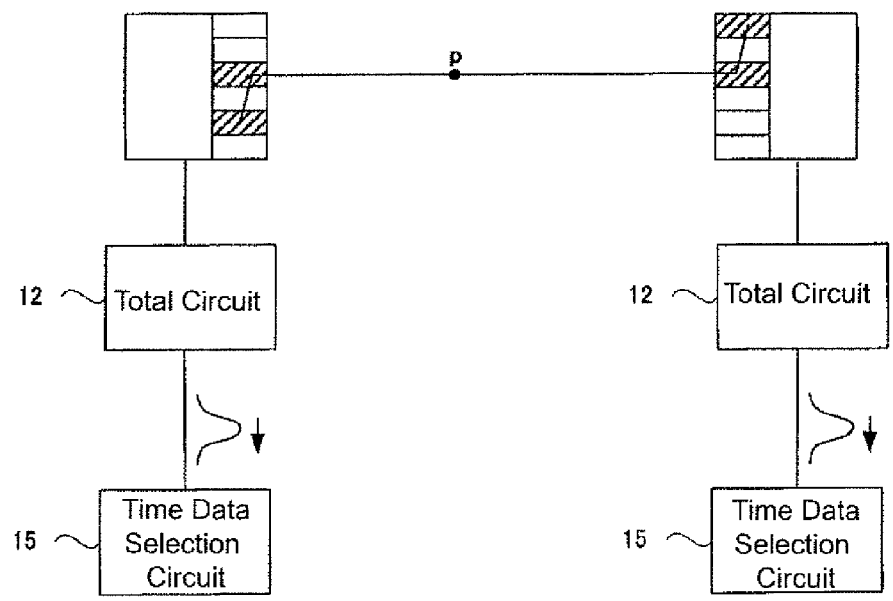
FIG. 15 is a schematic diagram illustrating an operation of a TOF-PET apparatus equipped a radiation detector according to the aspect of the present invention.

Referring to FIG. 15, the aspect in which the two radiation detectors forming the detector ring is detecting each of the γ-ray pair emitted at the emission-point p is illustrated. In such case, it is given that both of the γ-ray pair are detected by the radiation detector due to the multiple scattering event.

Referring to FIG. 15, one of the γ-ray pair is converted to plural fluorescences by plural scintillator crystals C of a radiation detector and weak pulse signals output from plural detection element 3a corresponding to such crystals are totaled, so that the time data can be generated based on such generated pulse signals. The time data selection circuit 15 outputs such time data to outside the radiation detector as the emission-time of the fluorescence, The other one of γ-ray pair is detected by the other radiation detector as well.

Figure 16:
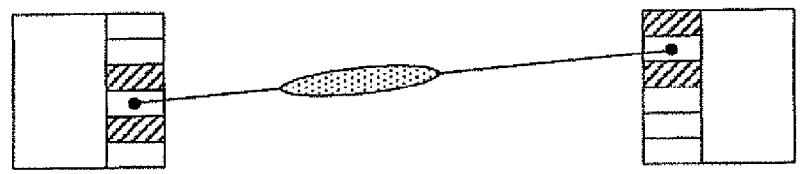
FIG. 16 is a schematic diagram illustrating an operation of a TOF-PET apparatus equipped a radiation detector according to the aspect of the present invention.

Referring to FIG. 16, when both of the γ-ray pair are detected by the multiple scattering event as illustrated in FIG. 15, the existing location of the emission-point of the γ-ray pair calculated by the TOF-PET apparatus is indicated by the shade. The emission-point p of the γ-ray pair is on the linear line (LOR) connecting the middle point of the plural scintillator crystals that detect one γ-ray and the middle point of the scintillator crystals that detected the other γ-ray. The existing location of the emission-point p of γ-ray pair is calculated given the location is the side of the detector which detects the γ-ray earlier than the other detector between two detectors that detect the γ-ray. The existing location of the emission-point p, which is calculated at this time, becomes broader than that in the case referring to FIG. 14. The time resolution of γ-ray detection is worsen as much as both of the γ-ray pair are detected by the multiple scattering event.

According to such principal, the image generation element 21, according to the aspect of the present invention, images the distribution of the radiopharmaceuticals by changing the time resolution depending on whether γ-ray is detected by the photoelectric absorption event or the multiple scattering event when the detection rings 20 detect the pair of the γ-ray pairs. Specifically, both of the γ-ray pair are detected by the photoelectric absorption event, the image generation element 21 determines that the γ-ray pair was detected with the high time resolution and processes the detected data having the comparably high time resolution therefor. In addition, both of the γ-ray pair are detected by the multiple scattering event, the image generation element 21 determines that the γ-ray pair was detected with the low time resolution and processes the detected data with the comparably low time resolution therefor. And when one of the γ-ray pair is detected by the photoelectric absorption event and the other one thereof is detected by the multiple scattering event, the image generation element 21 determines that the γ-ray pair is detected with the middle time resolution and processes the detected data with the comparably middle time resolution therefor.

As set forth above, if the radiation detector according to the aspect of the present invention is applied to the TOF-PET apparatus, the emission-point p of the γ-ray pair can be more accurately determined. Specifically, referring to FIG. 16, according to the conventional aspect, even if the emission of fluorescence takes place through the either event, the data having the poor time resolution can be only extracted. According to the aspect of the present invention, when the fluorescence is detected due to the photoelectric absorption event, the emission-location of the γ-ray pair can be calculated by extracting the data with the comparably high time resolution.

The present invention is not limited to the above Embodiment and may be operable in the following alternative aspect.

Figure 17:
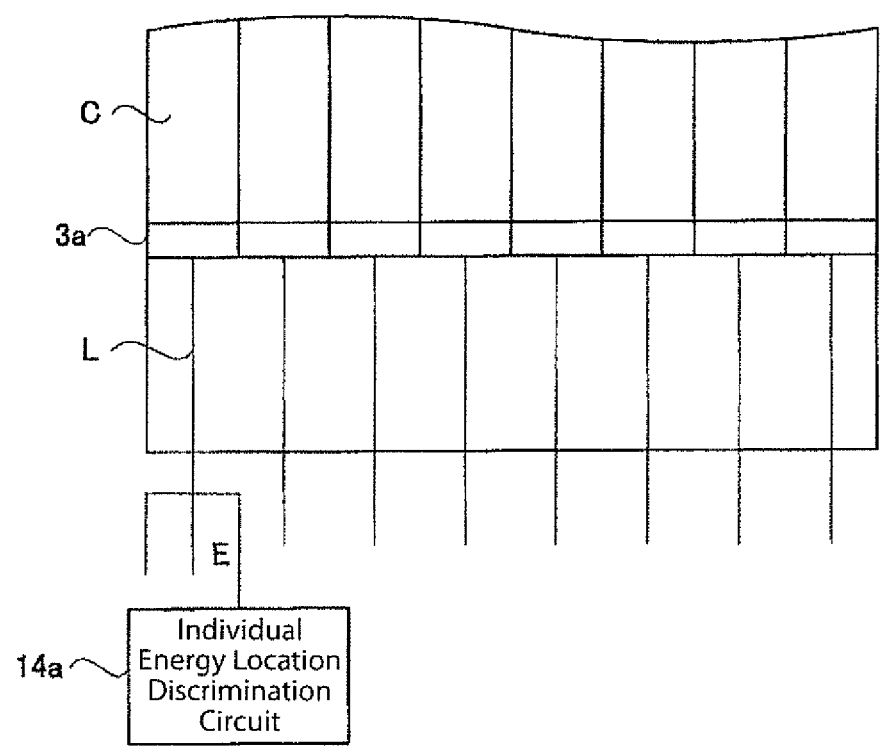
FIG. 17 is a schematic diagram illustrating an operation of a TOF-PET apparatus equipped a radiation detector according to the aspect of the present invention.

(1) According to the above aspect, referring to FIG. 5, the pathway E relative to each detection element 3a is input to one energy location discrimination circuit 14, but the present invention is not limited to such aspect. Referring to FIG. 17, the individual energy location discrimination circuit 14a corresponding to each detection element 3a can be equipped and the respective pathways E relative to each detection element 3a can be input to the individual energy location discrimination circuit 14.

Referring to FIG. 7B, according to such aspect, even if a γ-ray is detected due to the multiple scattering event, it can be determined which scintillator crystals emitted the fluorescence.

Figure 18:
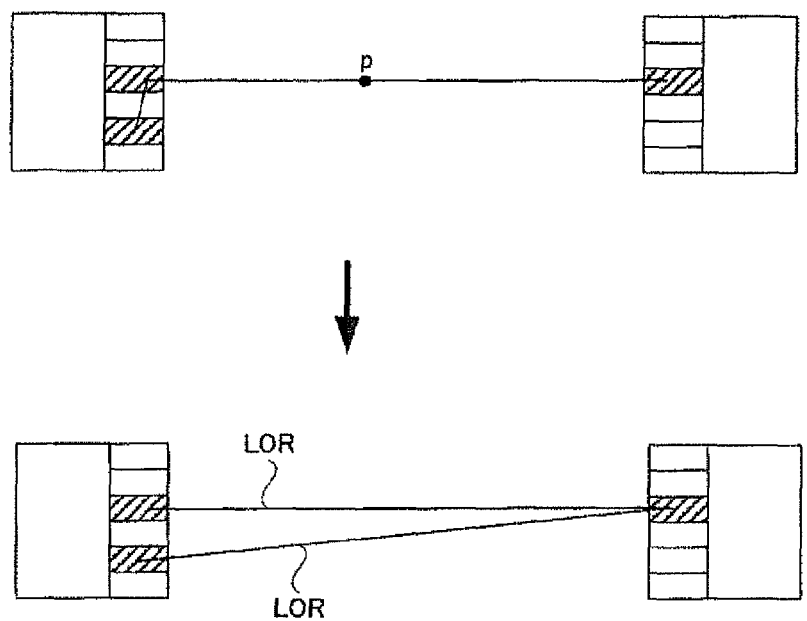
FIG. 18 is a schematic diagram illustrating an operation of a TOF-PET apparatus equipped a radiation detector according to the aspect of the present invention.

Referring to FIG. 18, the aspect in which the two radiation detectors forming the detector ring relative to the TOF-PET is detecting each one of the γ-ray pair emitted at the emission-point p is illustrated. In such case, it is given that one of the γ-ray pair is detected by the radiation detector due to the photoelectric absorption event and the other one is detected by the detector due to the multiple scattering event.

Then, referring to FIG. 18, two LORs can be obtained due to the detection of one pair of γ-rays. One of such pair is passing through the emission-point p of the γ-ray and the other one is out of the emission-point p. When a multiple scattering event takes place, only LOR relative to the scintillator crystal that first emits fluorescence among the scintillator crystals C that emit fluorescences passes through the emission-point p. Therefore, when the location of the emission-point p is determined, it must be determined which scintillator crystal emits the first fluorescence. When two scintillator crystals that emit fluorescences are well far away each other and the strengths thereof are different between two detected fluorescences, it is deemed that the scintillator crystal having the weaker fluorescence emits first. The fact that two scintillator crystals that emit are far away each other means that the γ-ray from the first scintillator crystal loses not much an energy thereof and keeps high permissibility thereof. Specifically, an occurrence of such multiple scattering event indicates; that the γ-ray incident first into the first scintillator crystal emits weak fluorescence, and then after becomes incident into the second scintillator crystal so as to emit the strong fluorescence. Accordingly, in such case, if a LOR is determined based on the scintillator crystal that emits the weak fluorescence, the location of the emission-point p of the fluorescence can be accurately predicted.

In addition, according to the aspect of the alternative Embodiment, the individual energy location discrimination circuit 14a can detect the strength of the fluorescence emitted from the scintillator crystal every crystal, so that it can be easily determined which fluorescence is weaker among the fluorescences emitted from two crystals.

Figure 19:
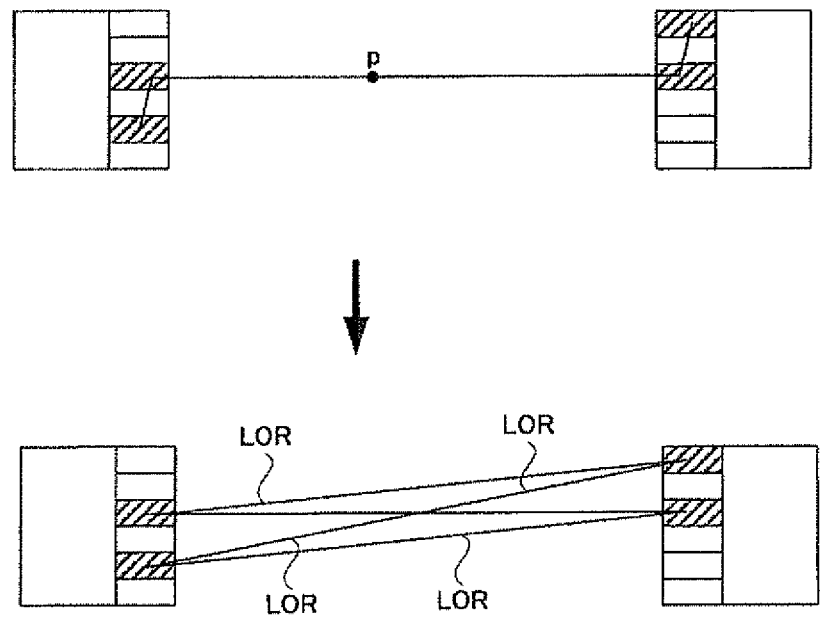
FIG. 19 is a schematic diagram illustrating an operation of a TOF-PET apparatus equipped a radiation detector according to the aspect of the present invention.

Referring to FIG. 19, the aspect in which the two radiation detectors forming the detector ring is detecting each one of the γ-ray pair emitted at the emission-point p is illustrated.

In such case, it is given that any γ-ray pairs are detected by the radiation detector due to the multiple scattering event.

In such case, four LORs can be involved. Even in such case, the LOR that passes through the emission-point p can be identified in the basis of the strength of fluorescence emitted from each different scintillator crystal in one detector.

Figure 20:
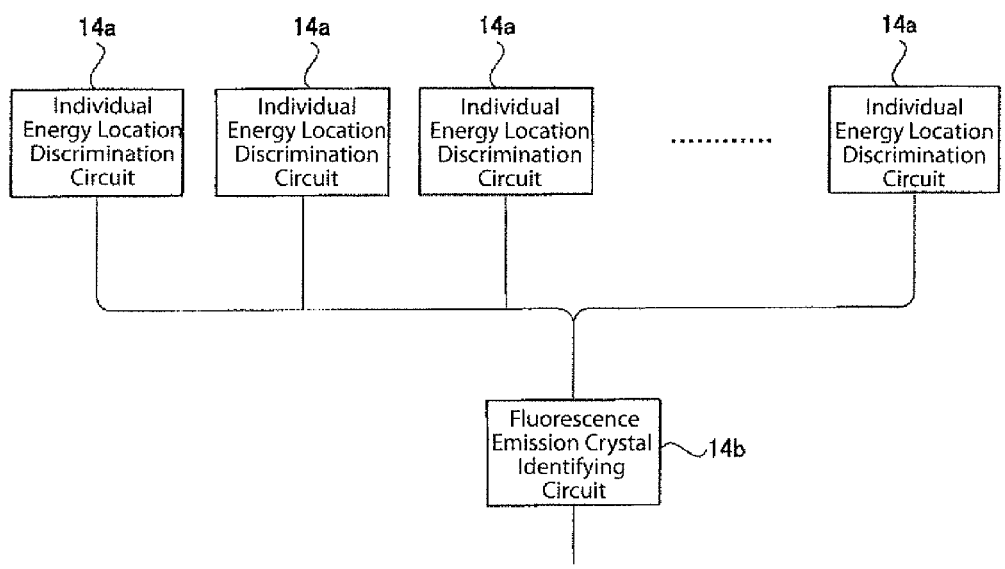
FIG. 20 is a plan view illustrating a structure of circuits relative to a radiation detector according to the aspect of the present invention.
Figure 21:
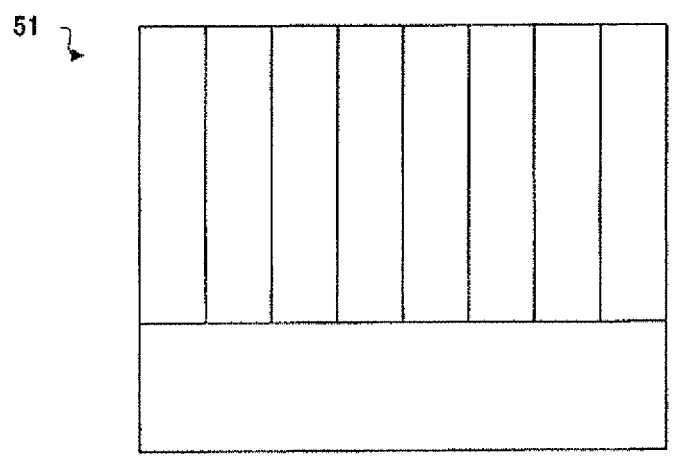
FIG. 21 is a schematic diagram illustrating a conventional radiation detector.

Such identification operation of scintillator crystal is carried out by a fluorescence emission crystal identification circuit 14b. Referring to FIG. 20, the fluorescence emission crystal identification circuit 14b receives the data relative an energy of fluorescence, which is output from each individual energy location discrimination circuit 14a. The fluorescence emission crystal identification circuit 14b determines the scintillator crystal corresponding to the detection element that emits a weaker pulse of two pulses as the emission-location of the fluorescence when two detection elements 3a output pulses relative to the fluorescence detection.

REFERENCE OF SIGN

2 Scintillator
3 Light detector
11 Individual comparator (Photoelectric absorption time calculation means)
12 Total circuit (Total means)
13 Total comparator (Multiple scattering time calculation means)
14 Energy location discrimination circuit (Fluorescence emission-location calculation means)
14b Fluorescence emission crystal identifying circuit (Crystal discrimination means)
15 Time data selection circuit (Event discrimination means)

Having described at least one of the preferred embodiments of the present invention with reference to the accompanying drawings, it will be apparent to those skills that the invention is not limited to those precise embodiments, and that various modifications and variations can be made in the presently disclosed system without departing from the scope or spirit of the invention. Thus, it is intended that the present disclosure cover modifications and variations of this disclosure provided they come within the scope of the appended claims and their equivalents.

What is claimed is:

1. A radiation detector, comprising:
   a scintillator, wherein a plurality of scintillator crystals that convert a radiation to a fluorescence are arranged in a matrix in a plane and unified;
   a light detector, having a plurality of individual detection elements corresponding to each said respective scintillator crystal, that detects a fluorescence emitted from said scintillator responsive to said radiation;
   wherein each output from each said detection element passes through a pathway to a circuit for calculating a fluorescence emission-time of a photoelectric absorption event that is a phenomenon under which fluorescence is emitted from each said respective single scintillator crystal, and to another circuit for calculating a combined fluorescence emission-time of a multiple scattering event that is a phenomenon under which fluorescences are emitted from said plural scintillator crystals; and
   further comprising:
   a photoelectric absorption time calculation circuit installed with each detection element, wherein pulses output from said detection element are input through the circuit for the photoelectric absorption event and the fluorescence emission-time relative to said photoelectric absorption event are calculated by converting the pulses to the time data;
   a total circuit that outputs the pulse totaling outputs from the respective circuits for the multiple scattering event relative to each detection element; and
   a multiple scattering time calculation circuit that calculates the fluorescence emission-time relative to said multiple scattering event by converting the pulses output from said total circuit to the time data.

2. The radiation detector, according to claim 1, comprising:
   an event discrimination circuit that determines that when a fluorescence is emitted from said scintillator; if the number of said detection elements that output a pulse relative to fluorescence detection is one, the fluorescence is emitted due to said photoelectric absorption event, and if the number of said detection elements that output pulses relative to fluorescence detection is plurality, the fluorescence is emitted due to said multiple scattering event.

3. The radiation detector, according to claim 1, comprising:
   a fluorescence emission-location calculation circuit that converts the pulses to the location data indicating the emission-location of the fluorescence by inputting the pulses output from said detection element through the circuit for the fluorescence emission-location; and
   wherein a circuit of the output pathways of said detection elements is a circuit to calculate the fluorescence emission-location.

4. The radiation detector, according to claim 3, comprising:
   a crystal discrimination circuit that determines that if the number of said detection elements that output pulses relative to the fluorescence detection is two, said scintillator crystal corresponding to said detection element that emits a weaker pulse of two pulses is specified as the emission-location of the fluorescence.

5. A TOF-PET apparatus, comprising:
   a radiation detector according to claim 1 and said TOF-PET apparatus further comprising:
   a detector ring formed by arranging said radiation detectors circularly; and
   an image generation circuit that performs imaging the distribution of radiopharmaceuticals by changing time-resolution depending on determining whether the radiation is detected by a photoelectric absorption event or a multiple scattering event when said detector ring detects a diminishing radiation pair.

* * * * *